United States Patent
Rogers et al.

(10) Patent No.: US 6,282,469 B1
(45) Date of Patent: Aug. 28, 2001

(54) COMPUTERIZED AUTOMOTIVE SERVICE EQUIPMENT USING MULTIPOINT SERIAL LINK DATA TRANSMISSION PROTOCOLS

(75) Inventors: Steven W. Rogers, Conway; David R. Coburn, II, Maumelle; Michael J. Kling, III, Little Rock; Jeffery G. Craig, Conway, all of AR (US)

(73) Assignee: Snap-On Technologies, Inc., Lincolnshire, IL (US)

( * ) Notice: Subject to any disclaimer, the term of this patent is extended or adjusted under 35 U.S.C. 154(b) by 0 days.

(21) Appl. No.: 09/120,594

(22) Filed: Jul. 22, 1998

(51) Int. Cl.[7] .............................. G06F 3/00; G01B 11/275
(52) U.S. Cl. .................................................. 701/29; 701/33
(58) Field of Search .......................... 701/29, 33; 710/72, 710/105; 33/288

(56) References Cited

U.S. PATENT DOCUMENTS

| | | | |
|---|---|---|---|
| 4,594,789 | * 6/1986 | Marino et al. | 33/288 |
| 4,931,964 | 6/1990 | Titsworth et al. | |
| 5,208,646 | 5/1993 | Rogers et al. | |
| 5,361,305 | * 11/1994 | Easley et al. | 381/58 |
| 5,513,439 | 5/1996 | Brauer et al. | |
| 5,535,522 | * 7/1996 | Jackson | 33/288 |
| 5,541,840 | * 7/1996 | Gurne et al. | 701/33 |
| 5,590,040 | 12/1996 | Abe et al. | |
| 5,600,435 | * 2/1997 | Bartko et al. | 356/139.09 |
| 5,724,743 | 3/1998 | Jackson. | |
| 5,734,569 | 3/1998 | Rogers et al. | |
| 5,758,300 | 5/1998 | Abe . | |
| 5,760,938 | 6/1998 | Hodge . | |
| 5,916,287 | * 6/1999 | Arjomand | 701/29 |
| 5,969,750 | * 10/1999 | Hsieh et al. | 348/15 |
| 5,978,077 | * 11/1999 | Koerner et al. | 356/139.09 |
| 5,991,546 | * 11/1999 | Chan et al. | 395/882 |
| 5,995,884 | * 11/1999 | Allen et al. | 701/24 |
| 6,005,613 | * 12/1999 | Endsley et al. | 348/231 |
| 6,009,363 | * 12/1999 | Beckert et al. | 701/33 |

FOREIGN PATENT DOCUMENTS 0 388 107 A3    12/1990   (EP) .

OTHER PUBLICATIONS

Hunter Engineering Co. Form 1824T, "Preliminary Hunter System C111 Service Manual", Sep. 1984.*
Hunter Engineering Co. Form 3576T, "Series 211 Computerized Wheel Alignment Systems", Dec. 1993.*
Hathaway et al.; Advanced low power system design techniques using USB microcontroller; IEEE; Nov. 1996; Northcon/96; pp. 270–274.*
IEEE standard for high performance serial bus; IEEE Std. 1394–1995; Aug. 1996; pp. iii, 1, 2, 19, 20.*
"Universal Serial Bus Specification", revision 1.0, Jan. 15, 1996, pp. 1–250.

* cited by examiner

*Primary Examiner*—Michael J. Zanelli
(74) *Attorney, Agent, or Firm*—McDermott, Will & Emery

(57) ABSTRACT

A multi-point serial link protocol, such as USB, is used to transfer vehicle diagnostic information back and forth between vehicle diagnostic sensors and a host computer. Multiple distinct vehicle servicing applications may be added to or removed from the service bay without requiring substantial software changes or revisions. The amount of vehicle diagnostic hardware is also minimized. The multi-point serial link may originate in the vehicle's on-board computer, allowing the vehicle itself to function as a data hub for the diagnostic automotive service sensors.

25 Claims, 8 Drawing Sheets

COMPUTERIZED AUTOMOTIVE SERVICE EQUIPMENT USING MULTIPOINT SERIAL LINK DATA TRANSMISSION PROTOCOLS

FIELD OF THE INVENTION

The present invention is directed to computerized automotive service equipment. More specifically, the present invention is directed to a system and method for communicating wheel angle or other vehicle diagnostic information between vehicle sensors and a host computer.

BACKGROUND OF THE INVENTION

Items of computerized automotive service equipment generally incorporate sensors located at the vehicle to provide indications of a vehicle's diagnostic state. For instance, wheel aligners utilize vehicle wheel angle sensors. Sometimes the sensors are not necessarily located at the vehicle, but are incorporated into an extravehicular apparatus, such as load unbalance detectors in wheel balancers. Recent designs have implemented personal computers in automotive service equipment. The current methods for coupling these sensors to the personal computer that performs the diagnostic evaluations and/or displays are through the computer's standard ports. In a modem PC, these include the serial port, the parallel port and internal ISA or PCI expansion slots (via an add-in board). The serial communications and parallel printer ports are the most convenient since they are standard on all PC's. Unfortunately, an operating system such as WINDOWS 3.1 or WINDOWS 95 typically expects that a printer, mouse, or modem is connected to serial communications and parallel printer ports. Connection of sensors to these ports often leads to conflicts in port addresses and available interrupts. Connecting sensors to the serial communications port is convenient but can be slow. Connecting sensors to the parallel printer port allows faster data transmission than the serial communications port but an additional printer port must then be added if a printer is desired. This again can lead to conflicts in port addresses and available interrupts. In both cases, to use a serial communications port or parallel printer port, a person knowledgeable about computers would most likely be required to configure the computer to support the connection of a sensor system.

An add-in sensor interface board allows very fast access to sensor information. Unfortunately, adding this board to a PC still requires a person knowledgeable of the computer to configure addresses and interrupts so there are no conflicts. Additionally, the physical layout of expansion slots is subject to change over time as newer models and protocols are developed, leading to obsolescence of current interface board specifications. Typically operating systems have no built-in support for a custom add-in board. Thus complex software must be written allowing the operating system and the automotive service program to communicate with the add-in board. This complex software must be re-written with the introduction of new, updated operating systems.

Still another problem in current systems exists when a single PC is required to support multiple sensor systems such as a wheel aligner combined with an engine analyzer. A PC has a limit to the number of add-in interface boards that can be added. There is a finite number of I/O addresses and interrupts that are available and once all of them are used, no additional boards may be added. The same problem exists if serial communications ports or parallel printer ports are used. Once the supported ports are used, it is difficult to add more. Furthermore, repair or replacement of interface boards may require specialized computer training for the automotive service technicians.

DESCRIPTION OF THE PRIOR ART

Automotive service equipment of the prior art have until recently used special purpose microprocessors or custom designed computer systems to process the electronic data signals generated by sensors for the purpose of facilitating servicing and repair of automobiles. These proprietary designed systems were optimized for data acquisition of particular automotive service systems sensors. For instance, automotive service systems designed for wheel alignment were designed specifically to acquire data from alignment sensors and display information and data related to wheel alignment.

FIG. 1 shows a typical arrangement. Special purpose computer 10 includes a microprocessor 14 and a data acquisition means 12, for example various hard wired ports associated with the special purpose computer 10. Automotive service system data sensors 16 are coupled to the data acquisition means 12 via appropriate cabling. Display 18 is connected to computer 10 and used as an operator interface.

Later, general purpose computers were used, such as IBM PC compatibles and other brands. General purpose computers of the prior art were not specifically designed for fast data acquisition from sensors and provided only standard serial point-to-point communications via RS-232 protocols, or standard "Centronics" style parallel port communications. Using the serial communications port or the parallel printer port was slow, and generally supported only one device.

FIG. 2 shows a typical arrangement. General purpose computer 20 is an IBM or Apple compatible. Computer 20 includes a microprocessor 22 and a standard UART communications port 24. Associated with the system is external sensor interface board 26, which contains its own UART 28 for transmission to UART 24. Sensors 32, 34, 36 and 38 are connected to the interface board 26 via input port means 30 with a standard hard wired connection.

U.S. Pat. No. 5,734,569, assigned to the assignee herein and hereby incorporated by reference, discloses fast sensor data acquisition on a general purpose computer. It discloses a system that circumvents some of the disadvantages of the use of the serial and parallel ports by connecting directly to the ISA or PCI ports inside the computer. FIG. 3 shows generally how this worked. General purpose computer 40 contains a microprocessor 42 and one of a plurality of expansion slots 46, connected to the microprocessor 42 via synchronous parallel data paths 44. Sensor interface board 48 plugs into the expansion slot 46. Board 48 contains a dual port RAM 50 that receives sensor data from automotive service system sensors 56 through UART 54 and microcontroller 52, both also residing on board 48. Dual port RAM occupies logical address space in computer 40, and thereby enables data acquisition speed on the order of the speed with which the microprocessor 42 accesses its own memory. Still, board 48 suffers from the deficiencies noted above, particularly limitation on expandability.

Another prior art arrangement utilizes a SCSI interface. The arrangement is shown generally in FIG. 4. Data acquisition unit 64 acquires sensor data from engine analyzer sensors 66. The unit 64 is connected to the SCSI interface of add-in board 62. This standard SCSI interface is a fast parallel type of interface for transmitting data between computer 60 and multiple external peripherals. This other prior art arrangement suffers from the same infirmities noted above with respect to hardware interface boards.

OBJECTS OF THE INVENTION

It is an object of the present invention to overcome the disadvantages of the prior art. More specifically, it is an object of the present invention to provide an improved computerized automotive service equipment system.

It is further an object of the invention to integrate a general purpose computer into automotive service equipment in a manner permitting multiple automotive service functions to reside on a single general purpose computer.

It is another object of the invention to provide a high speed multi-point serial link on an automotive service equipment sensor interface board that is easily connected to a general purpose computer through an operating system supported by an industry standard serial interface protocol.

It is still another object of the invention to provide automotive service equipment having a general purpose computer that can accommodate multiple sensor systems that all may be connected or disconnected without disassembling the general purpose computer.

It is another object of the invention to provide automotive service equipment where implementing the interface between the sensors and the general purpose computer does not require extensive knowledge of the low level computer architecture of the general purpose computer.

It is yet another object of the invention to reduce software complexity and development time for such automotive service equipment through the use of a serial transmission protocol that is physically and functionally expandable.

It is a further object of the invention to provide automotive service equipment having sensors that are directly connected into a system computer without the use of intervening hardware.

It is yet another object of the invention to provide a serial interface protocol for computerized automotive service equipment in which mixed mode isochronous data transfers and asynchronous messaging is enabled.

It is still a further object of the invention to provide automotive service equipment in which the sensors are dynamically attachable and reconfigurable.

It is yet another object of the invention to provide an automotive service system having a standard high-speed multi-point serial link to the data stream of the vehicle's on-board computers system.

SUMMARY OF THE INVENTION

The inventions are defined by the appended claims. For ease of reference, certain features thereof are summarized here.

The present invention comprises a vehicle diagnostic system having a general purpose computer, the computer capable of executing a vehicle diagnostic application and serving as a host for a multi-point serial link protocol, such as USB; a multi-point serial link operably coupled to the computer and having at least one port; at least one vehicle diagnostic sensor and/or data connection to the vehicle's on-board computer system operably coupled to the multi-point serial link through the respective port and each capable of sensing a vehicle diagnostic state. A change in the vehicle diagnostic state associated with the vehicle computer data or any one sensor provides an interrupt to the computer through the multi-point serial link.

In another aspect, the present invention comprises a vehicle diagnostic system having a general purpose computer, the computer capable of executing a vehicle diagnostic application and serving as a host for a multi-point serial link protocol, such as USB; a multi-point serial link operably coupled to the computer and having at least one port; at least one vehicle diagnostic sensor and/or a data connection to the vehicle's on-board computer system, operably coupled to the multi-point serial link through the respective port and capable of sensing a vehicle diagnostic state. The computer polls the vehicle computer data link or at least one sensor within a predetermined period of time and the vehicle computer data link or the respective sensors return a message to the computer through the hub indicative of the vehicle diagnostic state associated with vehicle computer data or the respective sensors.

In another aspect, the invention comprises a vehicle diagnostic system having a general purpose computer, the computer capable of executing a vehicle diagnostic application and serving as a host for multi-point serial link protocol, such as USB; a multi-point serial link operably coupled to the computer and having at least one port; at least one vehicle diagnostic sensor and/or a data connection to the vehicle's on-board computer system, operably coupled to the multi-point serial link through the respective port and capable of sensing a vehicle diagnostic state. The computer is capable of instantaneously detecting the addition or removal of the vehicle on-board computer communications link or sensor to and from a port and indicating such addition or removal to the vehicle diagnostic application.

In still a further aspect, the invention comprises a vehicle diagnostic system having a general purpose computer, the computer capable of executing a vehicle diagnostic application and serving as a host for a multi-point serial link protocol, such as USB; a hardware interface board comprising a RAM and a plurality of externally accessible serial communication ports, the RAM being shared by a multi-point serial link controller operably coupled between the computer and the RAM and a serial communications controller operably coupled to the plurality of ports; at least one vehicle diagnostic sensor and/or a data connection to the vehicle's on-board computer system, operably coupled to the link through the respective plurality of ports and each capable of sensing a vehicle diagnostic state associated with each respective sensor or data stream of the vehicle's on-board computer system. The serial communications controller periodically senses the vehicle diagnostic state at the at least one sensor or from the vehicle's onboard computer, and stores the vehicle diagnostic state in the RAM for access by the multi-point serial link controller.

In still a further aspect, the invention comprises a vehicle diagnostic system having a general purpose computer, the computer capable of executing a vehicle diagnostic application and serving as a host for multi-point serial link protocol, such as USB; a hardware interface board comprising interface logic and at least one externally accessible serial communication port, the interface logic being shared by a multi-point serial link controller, the multi-point serial link controller also operably coupled between the general purpose computer and the serial communications controller operably coupled to the at least one port; a plurality of vehicle diagnostic sensors or a connection to the vehicle on-board computer operably coupled to the interface board through the respective at least one port and each capable of sensing or responding to a vehicle diagnostic state associated with each respective sensor or connection to the vehicle on-board computer. The serial communications controller periodically senses the vehicle diagnostic state at each of the at least one sensors or vehicle computer link and passes the vehicle diagnostic state to the multi-point serial link controller for transmission to the computer.

In yet another aspect, the invention comprises a vehicle diagnostic system having a general purpose computer, the computer capable of executing a vehicle diagnostic application and serving as a host for multi-point serial link protocol, such as USB; a multi-point serial link operably coupled to the computer and having at least one port; at least one vehicle diagnostic sensor and/or a data connection to the vehicle's on-board computer system operably coupled to the multi-point serial link through the respective at least one port and each capable of sensing a vehicle diagnostic state through electrical coupling means capable of extending at least sixty feet from the general purpose computer.

In a still further aspect, the invention comprises a vehicle diagnostic system having a general purpose computer, the computer capable of executing a vehicle diagnostic application and serving as a host for a multi-point serial link protocol, such as USB; at least one vehicle diagnostic sensor and/or a data connection to the vehicle's on-board computer system comprising a multi-point serial link operably coupled to the general purpose computer and capable of sensing a vehicle diagnostic state. Each of the sensors or vehicle computer data connections comprises detection means for providing a stream of data indicative of the vehicle diagnostic state to its respective multi-point serial link for later communication to the computer, whereby the computer may provide the stream of data to the vehicle diagnostic application after receipt from the respective link.

DETAILED DESCRIPTION

The present invention makes use of a recently developed prior art computerized serial data transmission protocol, the "Universal Serial Bus," or "USB." The protocol is fully described in the Universal Serial Bus Specification, revision 1.0, Jan. 15, 1996, which is hereby incorporated by reference as if fully disclosed herein.

Figure 1:
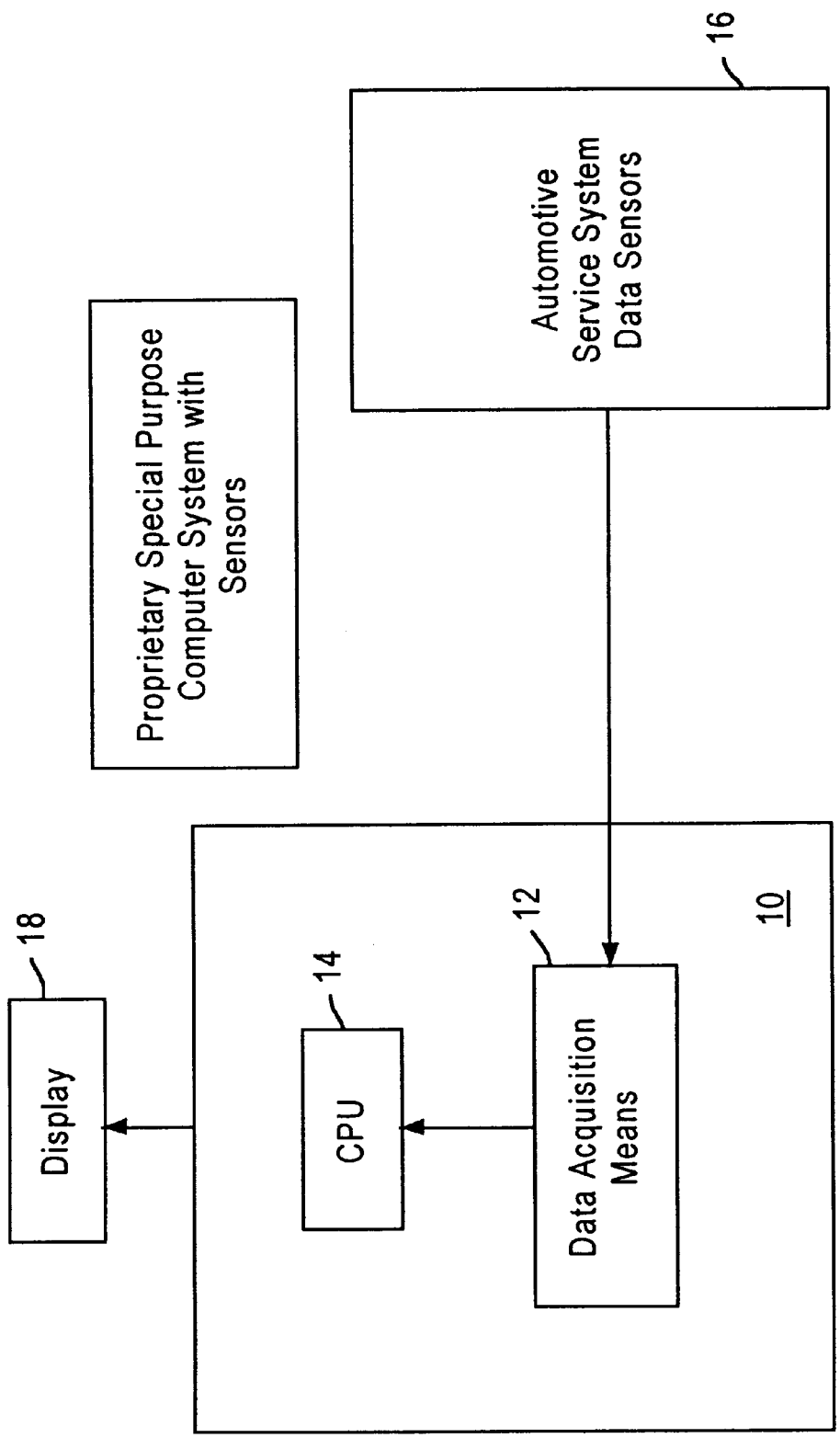
FIGS. 1–4 are diagrammatic representations of various prior art systems.
Figure 2:
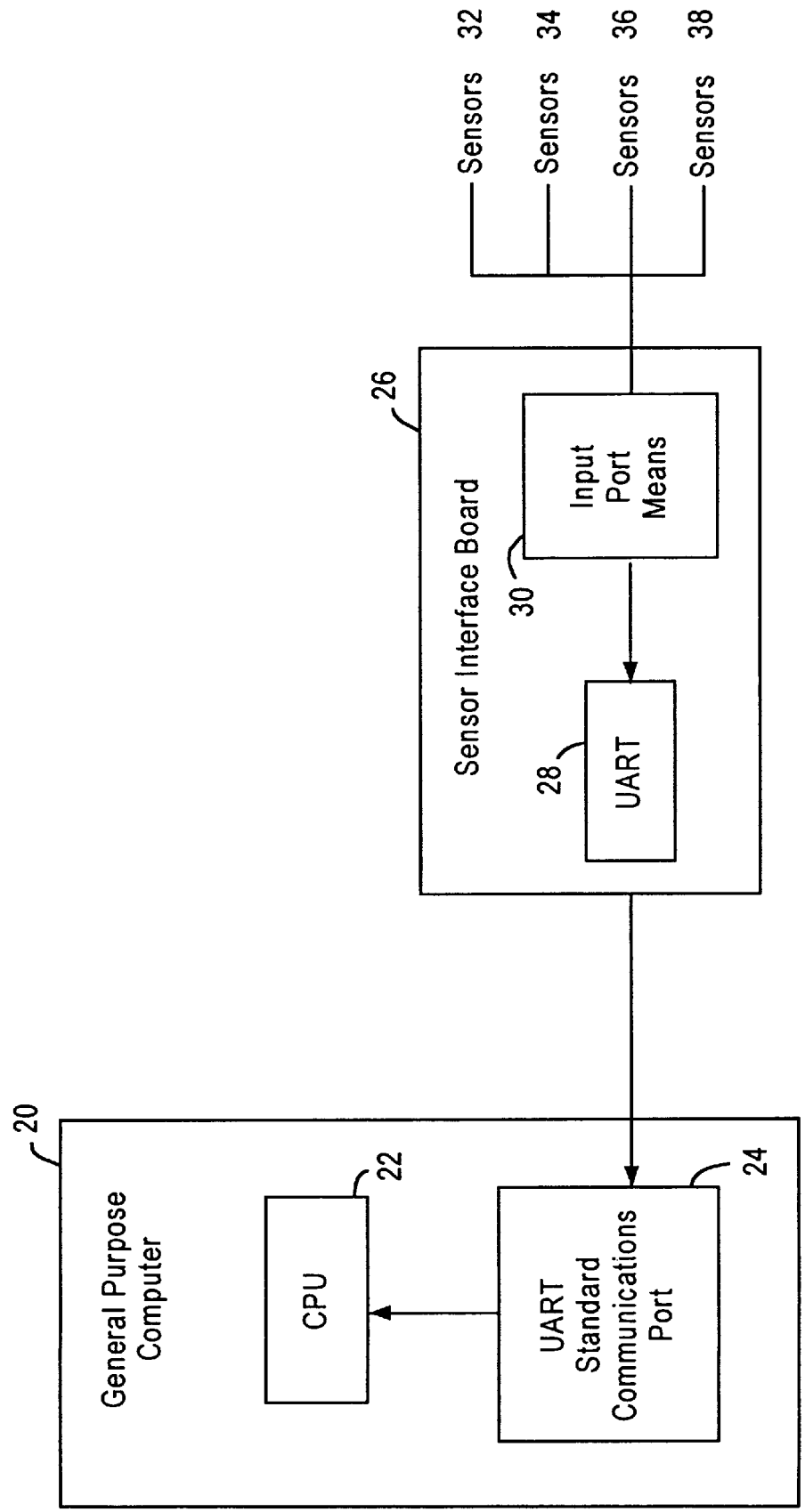
Figure 3:
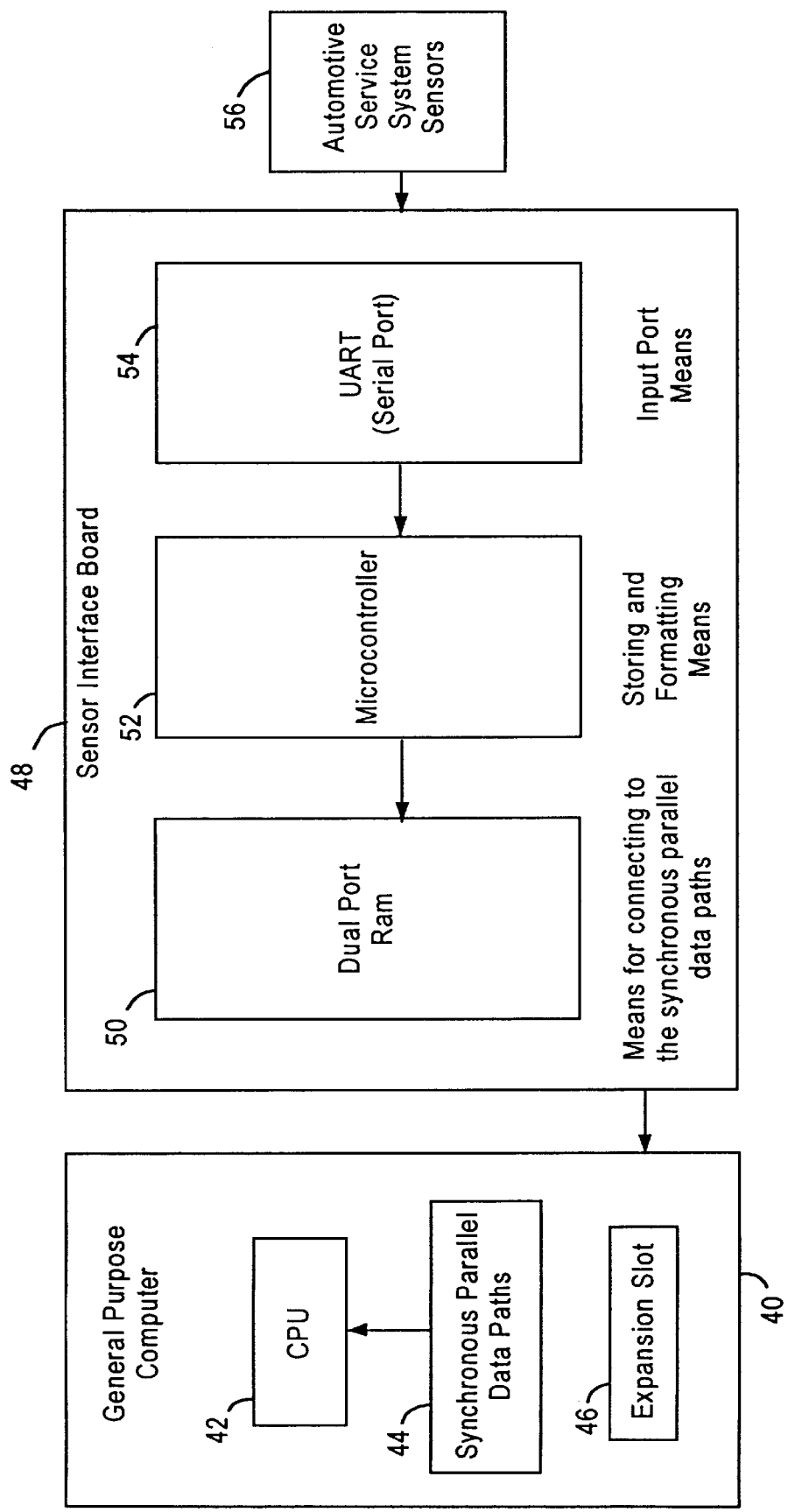
Figure 4:
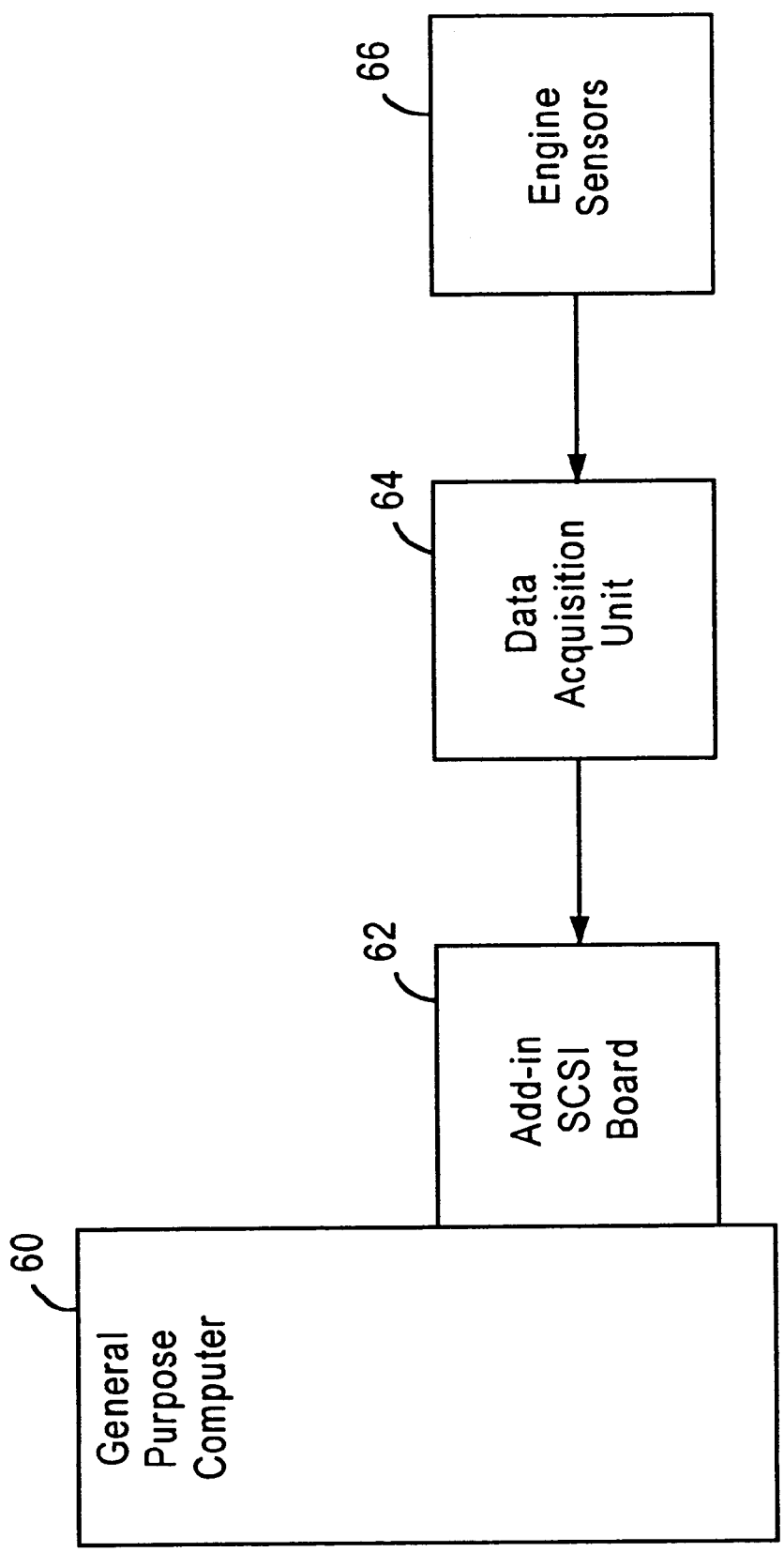
Figure 5:
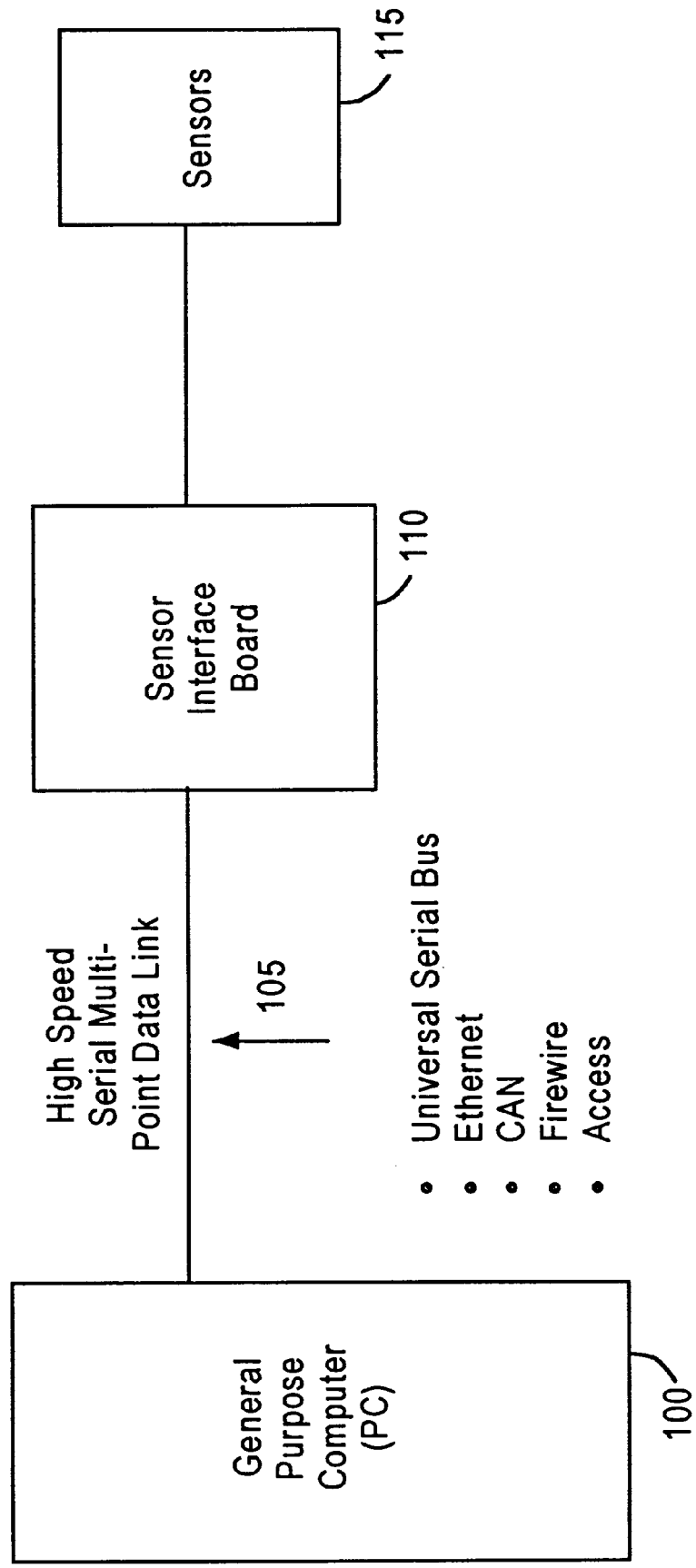
FIG. 5 illustrates a serial multi-point data link configuration employing sensor interface board in accordance with one embodiment of the present invention.

Reference will now be made to FIG. 5, which discloses an embodiment of the present invention. The embodiment of FIG. 5 is directed to a vehicle wheel alignment application, but it will be appreciated that the same principles are easily applied to other types of computerized automotive service equipment, such as engine analyzers, brake testers, wheel balancers and the like. Further, the term "automotive service equipment" can be understood to refer as well to equipment used to service other types of vehicles as well, such as trucks, vans, motorcycles, boats, airplanes and the like. Likewise, the term "sensor" contemplates any item that is capable of acquiring or receiving vehicle diagnostic information or related signals.

Sensors 115 are vehicle wheel alignment sensors, such as those disclosed in U.S. Pat. No. 4,931,964 and 5,208,646, both incorporated herein by reference. In use, sensors 115 are removably mounted to the rims of a vehicle wheel under test, and detect the alignment angles of the particular wheel on which they are mounted. They are capable of sensing such alignment angles as toe, camber, caster, SAI, Ackerman angle, and others, as is more fully described in U.S. Pat. No. 4,931,964. Sensors 115 each communicate with sensor interface board 110 over a communication medium, preferably a standard serial cable, although infrared and RF techniques are known and interchangeable with the cabling method.

Figure 6:
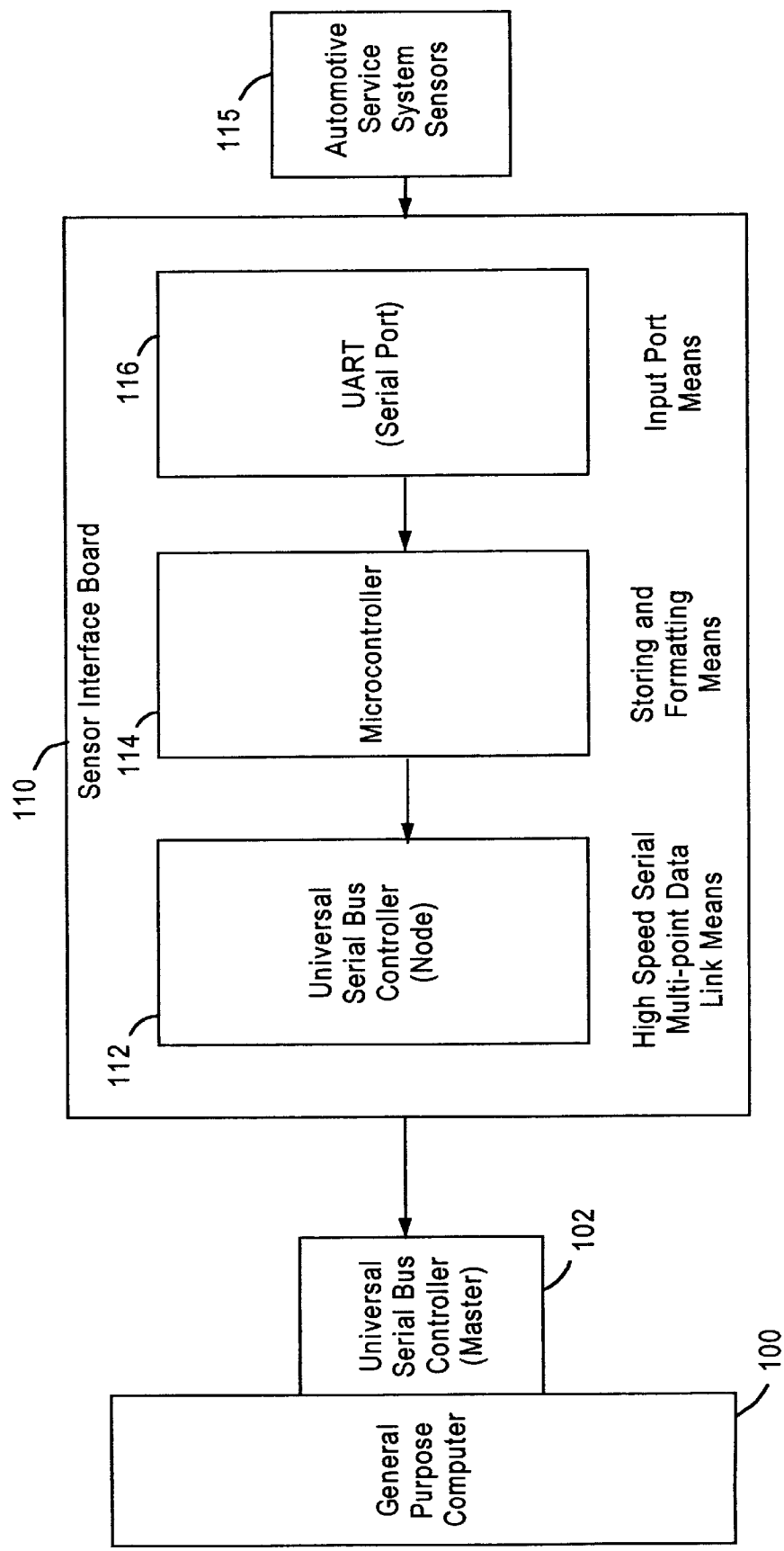
FIG. 6 illustrates one implementation of the sensor interface board illustrated in FIG. 5.

Reference is now made to FIG. 6, which contains further detail of the system shown in FIG. 5. Serial information about wheel angles first enters board 110 at UART 116 over a standard serial communication protocol, such as RS-232. Each sensor of the group of sensors 115 is associated with its own UART 116. Microcontroller 114 within board 110 is coupled with interface logic (such as a RAM, a dual port RAM, bus transceivers, and latches, not shown), into each UART 116 and performs two main functions. First, it polls each respective sensor 115 through its UART 116 in a continuous polling cycle. This permits it to obtain the raw signals from sensors 115 that are indicative of the respective wheel angle measurements. During each cycle, the raw angle signals from sensors 115 are each stored in a memory associated with microcontroller 114 (such as a dual port RAM, not shown). Up to this point, the operation of board 110 in this embodiment is similar to that described in U.S. Pat. No. 5,734,569. However, sensor interface board 110 also contains its own USB controller 112 operably coupled to the microcontroller 114 by interface logic (including dual-port RAM, not shown). USB controller 112 is available from Cypress Semiconductor Corporation, San Jose, Calif., as part number CY7C65113. USB controller 112 permits board 110 to constitute a USB "device," as understood in the USB specification, pages 34–37. USB controller 112 is configured to communicate with microcontroller 114 in board 110 to retrieve the raw angle signals for further transmittal as described below.

Referring again to FIG. 5, link 105 is shown between board 110 and general purpose computer 100. Link 105 is representative in this embodiment of a high speed multipoint data link, preferably selected from the list comprising Ethernet, CAN, Firewire, Access Bus, Token Ring, Arcnet, Local Talk, FDDI, ATM, and CDDI, and most preferably comprising USB. This high speed multi-port serial link replaces and improves the function of the interface board's dual port RAM as connected to the general purpose computer's parallel synchronous data paths, as disclosed in U.S. Pat. No. 5,734,569. The USB protocol is governed by general purpose computer 100, which is assumed to be equipped with USB capability, either within its operating system or added later as an enhancement. Computer 100 contains a USB host controller 102. USB host controller 102 is typically provided by the manufacturer of general purpose computer 100. General purpose computer 100 utilizes the USB protocol to receive the raw angle information from board 110 in one of at least two ways. First, an interrupt method may be used, as described in USB specification, pages 56–58. In the interrupt method, USB controller 112 initiates a communication with general purpose computer 100 through USB host controller 102 whenever a predetermined condition occurs, such as the change one of the vehicle wheel angles as detected by sensors 115. In this instance, host controller 102 accepts the communication from controller 112 as an interrupt, and directs computer 100 at the appropriate time to pause and take notice of incoming information. Then, a data packet containing the raw angle information is transmitted from controller 112 to host controller 102 over the USB link 105. Computer 100 is now capable of utilizing the raw sensor information in the data packet in the known way to convert it into wheel angle information for use by a vehicle wheel alignment application residing on computer 100, for instance the VISUALINER wheel alignment software available from the John Bean Company. Alternatively, another method may be used as follows. General purpose computer 100 initiates data acquisition cycles by passing an appropriate command from host controller 102 to USB controller 112. Once the command is received, microcontroller 114 responds by cyclically polling the sensors 115 for raw angle information, on the order of 8–10 times per second. Then on completion of each data acquisition cycle, the microcontroller 114 provides raw angle information to the USB controller 112 which sends an interrupt to the host controller 102, which in turn makes the information available to the automotive service application residing on general purpose computer 100.

In a second embodiment, computer 100 uses the USB protocol to receive raw angle information from board 110 to computer 100 through a USB polling, or messaging, procedure, as described in the USB specification, pages 54–56. This embodiment is distinct from the description above in the following way. Rather than the USB controller 112 sending an interrupt to the host controller 102 after each data acquisition cycle, the host controller 102 polls the USB controller 112 for the same information on a periodic basis as determined by the automotive service equipment application residing on computer 100.

A feature of each embodiment described above is dynamic reconfigurability. This is described in the USB specification, page 28. Sensor interface board 110 acts as a USB "device" because of the presence of USB controller 112. General purpose computer 100 acts as USB "hub" because of the presence of USB host controller 102. It will be appreciated that a host serves as the root hub, and therefore there is always at least one hub on a USB system. Hubs indicate the attachment or removal of a USB device in its per port status. The host queries the hub to determine the reason for the notification. The hub responds by identifying the port used to attach the USB device. The host enables the port and addresses the USB device with a control pipe using the USB default address. All USB devices are addressed using the USB default address when initially connected or after they have been reset. The host determines if the newly attached USB device is a hub or a device and assigns a unique USB address to the USB device. The host establishes a control pipe for the USB device using the assigned USB address and endpoint number zero. If the attached USB device is a hub and USB devices are attached to its ports, then the above procedure is followed for each of the attached USB devices. If the attached USB device is a function, then attachment notifications will be dispatched by USB software to interested host software.

Figure 7:
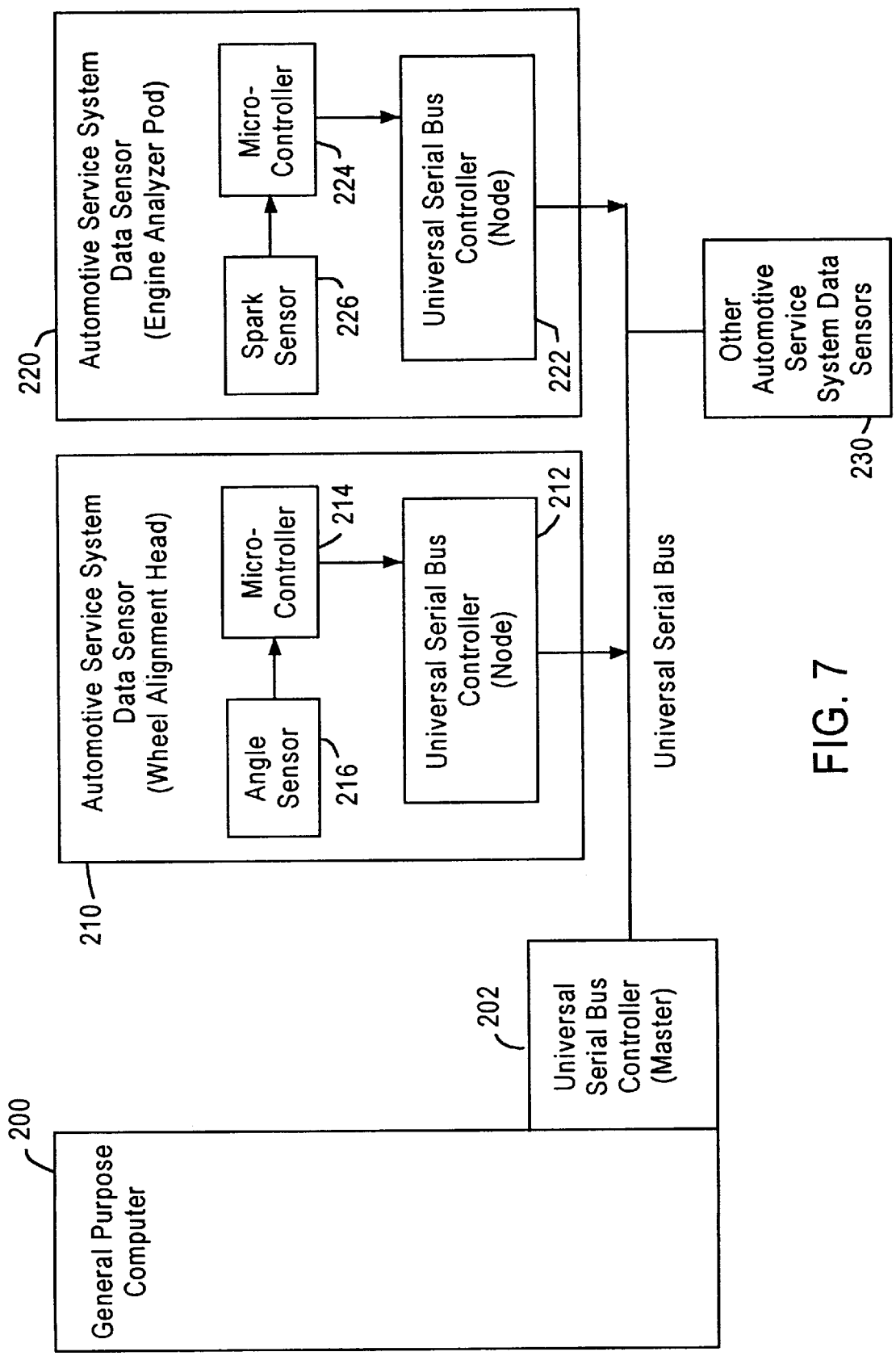
FIG. 7 illustrates a configuration in which sensors employ respective USB controllers in accordance with an embodiment of the present invention.

FIG. 7 shows another embodiment of the present invention, in which the USB protocol is extended to the sensors that form part of the automotive service equipment. In this embodiment, sensor 210 is a wheel alignment head, sensor 220 is an engine analyzer pod, and sensor 230 is any other kind of miscellaneous automotive service system data acquisition sensor. Here, multiple types of sensors are shown to illustrate the multitude of servicing features that can be provided to cooperate with automotive service applications on general purpose computer 200 using the USB multi-point high speed serial interface protocol. Another distinction of this embodiment is in its use of USB controllers physically located at the sensors, in contrast to the embodiment described above which used RS-232 serial data transmission at the sensors.

General purpose computer 200 contains multiple automotive service applications, including a vehicle wheel alignment application and an engine analyzer application. Computer 200 is also configured to act as a USB host. As such, it contains master controller 202, and acts as a root hub. Each sensor 210, 220 and 230 can be further described with reference to its parts. Wheel alignment head 210 contains microcontroller 214 coupled both to angle sensor 216 and USB controller 212. Likewise, engine analyzer pod 220 contains microcontroller 224 coupled both to spark sensor 226 and USB controller 222. While the details of generic sensor 230 are not shown, they will be similar to the foregoing for sensors 210 and 220. Generic sensor 230 will now be addressed in the following remarks. The respective USB controllers 212 and 222 are coupled to master controller 202 over a USB protocol as described before in connection with the embodiment of FIGS. 5 and 6. It will be appreciated that a separate multi-port USB hub (not shown) may be incorporated into the system to accommodate the multiple sensors, and couple them into the USB controller 202. In this manner, sensors 210, 220 and 230 may communicate with the automotive service applications residing on general purpose computer 200 without the need for a separate sensor interface board. Put another way, the functions of the sensor interface board are incorporated into the respective sensors, thus dispensing with the use of intervening hardware.

Figure 8:
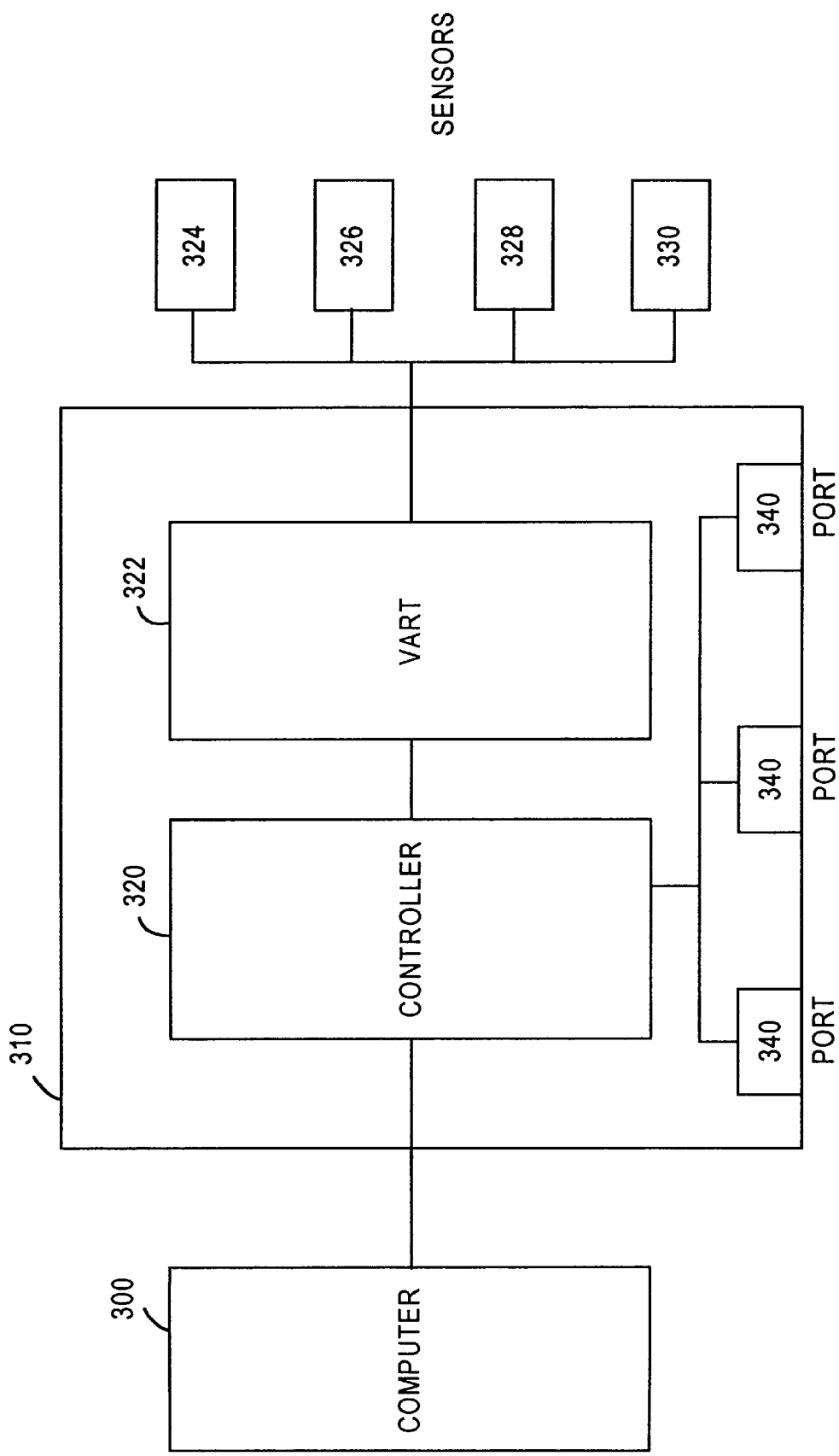
FIG. 8 illustrates a configuration employing a multifunction hub in accordance with an embodiment of the present invention.

FIG. 8 shows another embodiment of the present invention. In this embodiment, general purpose computer 300 contains an automotive service equipment application. Associated with this embodiment is multifunction hub 310. Hub 310 contains a USB hub controller 320 and UART 322. Sensors 324, 326, 328 and 330 are coupled to UART 322, which in turn is coupled to controller 320. As described so far, this embodiment functions identically to the embodiment associated with FIGS. 5 and 6. In addition to the above, however, hub 310 contains a plurality of USB ports 340 which are coupled into controller 320. In this manner, the embodiment of FIG. 8 may be used as a combination sensor interface board and USB hub for the connection of additional USB-based automotive service equipment, such as engine analyzers or wheel balancers. Naturally, any other USB-based peripheral may be attached to the ports in this embodiment as well, such as USB-based cameras, printers, modems and so on, as long as the appropriate application resides on computer 300.

In each of he above embodiments, the data eventually entering computers 100, 200 and 300 may also come directly from a vehicle's on-board computer. For example, the on-board data may be uploaded in the conventional manner via serial transmission to a sensor interface board, and then stored in a dual port RAM. Then, USB protocols may be used as hereinbefore described to transfer that data next to a host computer for display and analysis by either the computer or the service technician. Alternatively, the vehicle on-board computer data may be transferred directly by incorporating a USB controller and associated protocol directly into the on-board computer. Thus, a physical or RF/IR data link may be established with a service bay computer, whereupon the on-board computer itself functions as a USB device or hub. If a hub, then wheel alignment/engine analyzer sensors may be linked directly into the vehicle on-board computer, which thereupon uses USB protocols to transfer the respective sensor data to the host computer.

In each of the above embodiments, general purpose computers 100,200 and 300 may be located on a repair shop floor several yards away from the sensors that take in the data. Hence, the length of any cabling might exceed the maximum cable length dictated in the USB specification—5 meters. Therefore, between any two points in the USB transmission (such as between USB-based sensors and a USB hub, or between USB-based interface board and USB host controller), line driver devices are added to maintain the necessary USB signal voltages on cabling even as long as 60 feet by compensating for the inherent lossiness of the transmission line.

It will be appreciated that the embodiments described above are merely exemplary and should not be deceived as limiting, and that the rights granted in these letters patent are defined by the following claims. For example, the present invention may be profitably incorporated into a 3-D aligner, such as that disclosed in U.S. Pat. No. 5,724,743, incorporated herein by reference, to couple the camera pods to the host computer. For another example, the present invention may be used with a remote display device carried by an operator around the vehicle. In this example, the remote display device may receive a data transmission via a multi-point serial link from the host computer so that the operator may view vehicle diagnostic information remotely from any display connected to the host computer.

What is claimed is:

1. A vehicle diagnostic system comprising:
   a general purpose computer capable of executing a vehicle diagnostic application and serving as a multi-point serial link protocol host;
   a multi-point serial link configured to couple to the general purpose computer and having at least one multi-point serial link port;
   at least one vehicle diagnostic sensor configured to couple to the at least one multi-point serial link port and capable of sensing a vehicle diagnostic state associated with the at least one sensor and providing the vehicle diagnostic state through the multi-point serial link, wherein the vehicle diagnostic state includes a vehicle wheel alignment angle; and
   wherein the multi-point serial link is located within the vehicle in operable communication with a vehicle on-board computer.

2. A vehicle diagnostic system comprising:
   a general purpose computer capable of executing a vehicle diagnostic application and serving as a multi-point serial link protocol host;
   a multi-point serial link configured to couple to the computer and having at least one multi-point serial link port;
   at least one vehicle diagnostic sensor configured to couple to the at least one multi-point serial link port and capable of sensing a vehicle diagnostic state associated with the at least one vehicle diagnostic sensor and providing the vehicle diagnostic state through the multi-point serial link, wherein the vehicle diagnostic state includes a vehicle wheel alignment angle;
   wherein the computer is capable of instantaneously detecting the addition or removal of the at least one vehicle diagnostic sensor to and from the at least one multi-point serial link port and indicating such addition or removal to the vehicle diagnostic system; and
   wherein the vehicle diagnostic application comprises both a vehicle wheel alignment application and a vehicle engine diagnostic application, and the at least one vehicle diagnostic sensor comprises both at least one vehicle wheel angle alignment sensor and at least one engine diagnostic sensor.

3. The system of claim 2 whereupon a change in the vehicle diagnostic state associated with any one sensor, the respective sensor provides an interrupt to the computer through the multi-point serial link.

4. The system of claim 3 wherein the interrupt comprises a stream of data indicative of a change in the vehicle diagnostic state.

5. The system of claim 3 wherein the system comprises a vehicle wheel alignment system and the vehicle diagnostic sensors comprise vehicle wheel alignment angle sensors.

6. The system of claim 3 wherein the interrupt comprising a stream of data indicative of the direction and magnitude of change in the vehicle wheel alignment angle.

7. The system of claim 3 wherein after receipt of the interrupt, the computer provides the interrupt to the vehicle diagnostic application.

8. The system of claim 2 wherein the multi-point serial link comprises a Universal Serial Bus (USB) hub.

9. The system of claim 1 wherein the computer polls each of a plurality of sensors within a predetermined period of time and the respective sensors return a message comprising a stream of data to the computer through the link indicative of the vehicle diagnostic state associated with the respective sensors.

10. The system of claim 9 wherein the message comprises a stream of data indicative of vehicle diagnostic state.

11. The system of claim 9 wherein the system comprises a vehicle wheel alignment system and the vehicle diagnostic sensors comprise vehicle wheel alignment angle sensors.

12. The system of claim 11 wherein the message comprises a stream of data indicative of the direction and magnitude of the change in the vehicle wheel alignment angle.

13. The system of claim 9 wherein after receipt of the message, the computer provides the stream of data to the vehicle diagnostic application.

14. The system of claim 2 further comprising a second multi-point serial link operably coupled to the first link through one of the plurality of ports, the second link also comprising a plurality of ports, the computer being capable of instantaneously detecting the addition or remove of the second link to and from the ports.

15. The system of claim 2 further comprising a remote display operably coupled to the multi-point serial link host whereby for transmitting vehicle diagnostic information to the remote display device over a multi-point serial link protocol.

16. The system of claim 1, wherein the multi-point serial link is implemented in a universal serial bus (USB) protocol.

17. The system of claim 2, wherein the multi-point serial link comprises a universal serial bus (USB) multifunction hub.

18. A vehicle diagnostic system comprising:
   a general purpose computer capable of executing a vehicle diagnostic application and serving as a multi-point serial link protocol host;
   a hardware interface board comprising interface logic, a multi-point serial link device controller, a serial communication controller, and, at least one externally accessible serial communication port, the interface logic being shared by the multi-point serial link device controller and the serial communication controller, the serial communications controller being operably coupled to the at least one externally accessible serial communication port, and the multi-point serial link device controller being configured to couple between the computer and the interface logic; and at least one vehicle diagnostic sensor configured to couple to the serial communications controller through one of the externally accessible serial communication ports and each capable of sensing a vehicle diagnostic state associated with the at least one sensor;

wherein the serial communication controller periodically senses the vehicle diagnostic state at one or more sensors and provides the vehicle diagnostic state to the device controller.

19. The system of claim 18 wherein the interface logic includes at least one from the list comprising: RAM, Dual Port RAM, Bus Transceivers and Latches.

20. The system of claim 18 wherein the computer periodically polls the device controller and the device controller returns a message comprising a stream of data from the serial communication controller to the computer indicative of the vehicle diagnostic state associated with the at least one sensor.

21. A vehicle diagnostic system comprising:

a general purpose computer capable of executing a vehicle diagnostic application and serving as a multi-point serial link protocol host;

at least one vehicle diagnostic sensor comprising a multi-point serial link device controller configured to couple to the computer and capable of sensing a vehicle diagnostic state associated with the sensor, the at least one sensor comprising detecting means for generating data indicative of the vehicle diagnostic alignment state and providing the data to its device controller for later communication to the computer, wherein the vehicle diagnostic state includes a vehicle wheel alignment angle, whereby the computer may provide the data to the vehicle diagnostic application after receipt from the at least one sensor;

wherein the computer is capable of instantaneously detecting the addition or removal of the at least one vehicle diagnostic sensor to or from the computer and indicating such addition or removal to the vehicle diagnostic system; and wherein the vehicle diagnostic application comprises both a vehicle wheel alignment application and a vehicle engine diagnostic application, and the at least one vehicle diagnostic sensor comprises both at least one vehicle wheel angle alignment sensor and at least one engine diagnostic sensor.

22. A vehicle diagnostic system comprising:

a general purpose computer configured to execute a vehicle diagnostic application;

at least one sensor configured to couple to the computer through a port on a multi-point serial link protocol hub, the hub communicating with the computer via a multi-point serial link protocol;

wherein the hub comprises a plurality of additional ports for making multi-point serial link connections to additional sensors;

wherein the computer is capable of instantaneously detecting the addition or removal of the at least one sensor to or from the port and indicating such addition or removal to the vehicle diagnostic system;

wherein the vehicle diagnostic application comprises both a vehicle wheel alignment application and a vehicle engine diagnostic application, and the at least one diagnostic sensor comprises both at least one vehicle wheel angle alignment sensor and at least one engine diagnostic sensor.

23. A vehicle diagnostic system comprising:

a general purpose computer configured to execute a vehicle diagnostic application;

a wheel alignment sensor configured to couple to a vehicle on-board computer; and means in the general purpose computer configured for receiving alignment information from the vehicle on-board computer via a multi-point serial link protocol;

wherein the general purpose computer is remote from the vehicle.

24. The system of claim 23 wherein the multi-point serial link protocol comprises USB.

25. The system of claim 23, further comprising at least one vehicle diagnostic sensor selected from the group consisting of an engine analyzer sensor and a vehicle wheel balancer sensor.

* * * * *